US011514365B2

(12) United States Patent
Cheruvu et al.

(10) Patent No.: US 11,514,365 B2
(45) Date of Patent: Nov. 29, 2022

(54) IMMUTABLE WATERMARKING FOR AUTHENTICATING AND VERIFYING AI-GENERATED OUTPUT

(71) Applicant: Intel Corporation, Santa Clara, CA (US)

(72) Inventors: Ria Cheruvu, Tempe, AZ (US); Anahit Tarkhanyan, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 362 days.

(21) Appl. No.: 16/901,770

(22) Filed: Jun. 15, 2020

(65) Prior Publication Data

US 2021/0390447 A1 Dec. 16, 2021

(51) Int. Cl.
*H04L 9/40* (2022.01)
*G06N 20/00* (2019.01)
*G06F 9/30* (2018.01)
*H04L 9/32* (2006.01)

(52) U.S. Cl.
CPC ......... *G06N 20/00* (2019.01); *G06F 9/30101* (2013.01); *H04L 9/3242* (2013.01); *H04L 9/3247* (2013.01)

(58) Field of Classification Search
CPC ... G06N 20/00; G06F 9/30101; H04L 9/3242; H04L 9/3247
See application file for complete search history.

(56) References Cited

U.S. PATENT DOCUMENTS

| 10,477,707 | B1* | 11/2019 | Petersen | H05K 5/003 |
|---|---|---|---|---|
| 10,693,872 | B1* | 6/2020 | Larson | G06F 9/451 |
| 2019/0362841 | A1* | 11/2019 | Aysin | G16H 40/60 |
| 2019/0370687 | A1* | 12/2019 | Pezzillo | H04L 67/10 |
| 2020/0258600 | A1* | 8/2020 | Will | G16H 10/60 |
| 2020/0285737 | A1* | 9/2020 | Kraus | G06F 21/552 |
| 2020/0374534 | A1* | 11/2020 | Chen | H04N 19/176 |
| 2021/0035012 | A1* | 2/2021 | Beaty | G06N 20/00 |
| 2021/0092462 | A1* | 3/2021 | Cox | H04N 21/251 |
| 2021/0365772 | A1* | 11/2021 | Zhang | G06N 3/04 |

OTHER PUBLICATIONS

Alzantot et al. "Generating Natural Language Adversarial Examples" Sep. 24, 2018, Conference on Empirical Methods in Natural Language Processing, version 2, pp. 1-9.
(Continued)

*Primary Examiner* — Ghodrat Jamshidi
(74) *Attorney, Agent, or Firm* — Jaffery Watson Mendonsa & Hamilton LLP

(57) ABSTRACT

Embodiments are directed to immutable watermarking for authenticating and verifying artificial intelligence (AI)-generated output. An embodiment of a system includes a hardware accelerator to perform processing related to a machine learning (ML) model and one or more processors including a hash generator. In one implementation, the hash generator is to identify a global unique identifier (GUID) for the ML model, generate a digital signature for content generated by an inference stage of the ML model, the digital signature based on at least the GUID of the ML model and the content generated by the ML model, and transmit the content and the digital signature to a content consumer platform.

20 Claims, 6 Drawing Sheets

(56) References Cited

OTHER PUBLICATIONS

Deepfake, "Wikipedia, the free encyclopedia" Feb. 20, 2018. Retrieved Jun. 15, 2020, from https://en.wikipedia.org/wiki/Deepfake.
Radford et al. "Language Models are Unsupervised Multitask Learners" 2019, OpenAI, San Francisco, California, pp. 1-24.
Strobelt et al., "Catching a Unicom with GLTR: A tool to detect automatically generated text" Jun. 7, 2020 archive. Retrieved Jun. 15, 2020, from https://gltr.io.
Unknown "Grover—A State-of-the-Art Defense against Neural Fake News" Jun. 4, 2020 archive. Retrieved Jun. 15, 2020, from https://grover.allenai.org.
Zhang et al. "Protecting Intellectual Property of Deep Naural Networks with Watermarking" Jun. 4-8, 2018, Association for Computing Machinery pp. 1-13.

\* cited by examiner

500

510 Receive, by a processor of a content consumer platform, content generated by a machine learning (ML) model and a digital signature corresponding to the content

520 Process the digital signature to extract, from the digital signature, a global unique identifier (GUID) of the ML model that generated the content

530 Verify the extracted GUID against data obtained from a shared registry, the data obtained from the shared registry comprising identifying information of the ML model including the GUID

540 Extracted GUID successfully verified?

YES → 550 Provide the content for consumption at the content consumer platform and indicating that the content is generated by the ML model having verified authenticity NO → 560 Refuse the content for consumption at the content consumer platform and indicate that the ML model generating the content is not verified for authenticity

*FIG. 5*

IMMUTABLE WATERMARKING FOR AUTHENTICATING AND VERIFYING AI-GENERATED OUTPUT

TECHNICAL FIELD

Embodiments described herein generally relate to the field of electronic devices and, more particularly, to immutable watermarking for authenticating and verifying AI-generated output.

BACKGROUND

AI (Artificial Intelligence) and ML (Machine Learning) training and inferencing are vulnerable to multiple different adversarial machine learning threats. These threats include attacks to model extraction or reverse engineering the model, poisoning of a model during training, inversion attack to extract training data, and evasion attack in which the attacker modifies the input to evade detection.

Adversarial ML attacks are possible during both training and inferencing. As AI and ML processing continue to move into new technical fields, conventional reliance on algorithmic methods to detect and thwart adversarial attacks is insufficient, and thus additional security measures may be implemented.

BRIEF DESCRIPTION OF THE DRAWINGS

Embodiments described here are illustrated by way of example, and not by way of limitation, in the figures of the accompanying drawings in which like reference numerals refer to similar elements.

FIG. 5 is a flowchart to illustrate a process for immutable watermarking for authenticating and verifying AI-generated output according to some embodiments.

DETAILED DESCRIPTION

Figure 1:
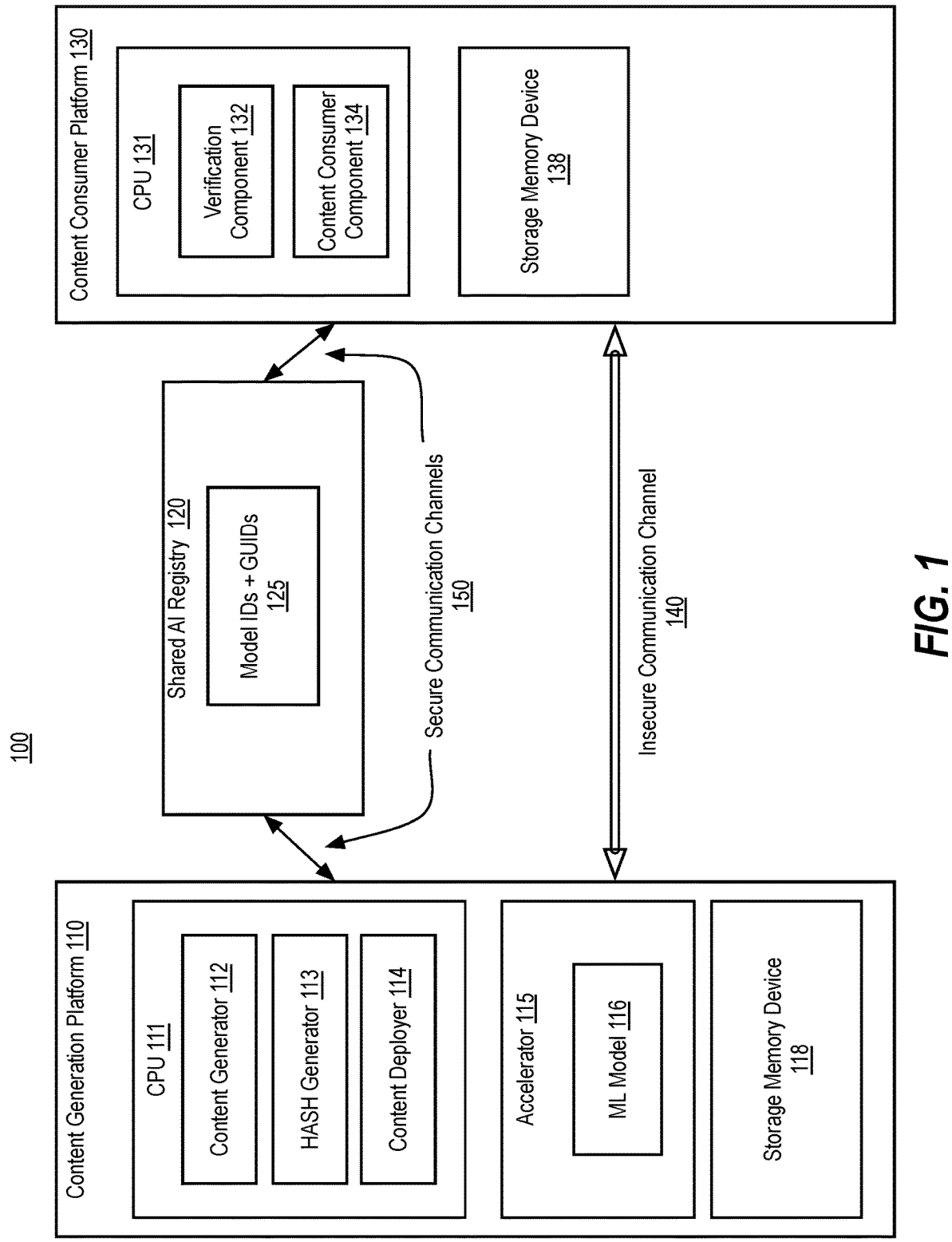
FIG. 1 is an illustration of a system to provide immutable watermarking for authenticating and verifying AI-generated output according to some embodiments.

Embodiments described herein are directed to immutable watermarking for authenticating and verifying artificial intelligence (AI)-generated output.

Adversarial Machine Learning (ML) is a rapidly emerging class of threats against ML models or training data during training and inferencing. Examples of such threats include:

Model extraction attack: An attacker attempts to extract or reverse engineer a trained model by inputting a large amount of data for inferencing and then analyze the inference results.

Model poisoning attack: An attacker purposely feeds incorrect input data during training to maliciously alter trained models. For example, an attacker may submit diagnostic image of a sick person and label it as not sick which would cause to model to be trained incorrectly for diagnosis operation.

Model inversion attack: An attacker attempts to recover training input data used to train a model by looking at statistics accompanying the inference results, such as confidence level. Confidence level of 100% may indicate parity with the input data used for training.

Evasion attack: An attacker modifies the input data to avoid detection of an attack.

Furthermore, the exponential growth of AI has introduced the problem of determining the trustworthiness and consequently the reliability of information and/or data generated from AI sources. There is no reliable solution to distinguish between the data (e.g. text or images) produced by state-of-the-art AI models (machine learning algorithm) versus data produced by humans. Inability to distinguish between AI-generated output and human-generated output is leading to security and ethical risks. For example, the lack of the traceability of data origin and the inability of "data" customers to perform controls and audit leads to the above-noted risks. Moreover, the use of unreliable information and/or data can weaken brand trust, which can violate regulations and trigger legal action against the consumer of the untrustworthy data.

One previous solution to address the above-noted data origin traceability problem is restriction of publishing AI-model generated output. However, this is not a practical solution as AI is being rapidly adopted, developed, and deployed across the compute continuum and complexity of the AI development supply chain.

Another previous solution to the above-noted data origin traceability problem is a watermarking approach for deep neural networks (DNN), where certain content is embedded in original training data as watermarks that are exhibited during inference when providing pre-specified predictions to the model. These prior watermarking approaches apply to protecting the DNN model using the input data (training data), and as such, can introduce distortion to the model. These distortions may, for example, change the meaning of the input data and modify the output of the model (e.g., lead to false negative or false positives).

Other previous solutions may utilize machine learning models or forensic systems to predict whether text was generated by a model or a human. These machine learning or forensics based solutions can also risk many false negative and/or false positive outcomes. In addition, implementation of these machine learning models or forensics systems is often not practical in industry applications as they are expensive and difficult to deploy and maintain.

Implementations of the disclosure address the above-noted data origin traceability problem by providing a system or process for immutable watermarking for authenticating and verifying AI-generated output utilizing a globally unique identifier (GUID). The GUID of implementations of the disclosure is used to authenticate and validate the output of content with respect to the identity of the author or owner of the outputted content (e.g., the ML model or human author). Implementations of the disclosure fuse the content data (e.g., ML-model generated data) with the GUID to enabled provenance identification and verification of the content data. Implementations of the disclosure utilize a watermarking approach based on three components to enable traceability of origin of content. The three components may include, but are not limited to, a sender, a verifier, and a shared AI registry (each of which are or are provided by trusted entities). Implementations of the disclosure provide protection of AI and ML models, and the output data generated from such models, in addition to supporting an end-to-end ML security pipeline by helping secure the authenticity and validity of output data. Implementations of the disclosure can address the ethical implications and protective measures that can be built as part of software to support efficient ML technologies.

FIG. 1 is an illustration of a system 100 to provide immutable watermarking for authenticating and verifying AI-generated output according to some embodiments. As illustrated in FIG. 1, system 100 includes a content generation platform 110, a shared AI registry 120, and a content consumer platform 130. Content generation platform 110, shared AI registry 120, and content consumer platform 130 may be communicably coupled via a wired or wireless network (not shown), such as a local or wide area network, or high speed interconnect. In some implementations, content generation platform 110, shared AI registry 120, and content consumer platform 130 may be directly communicably coupled via a wired or wireless connection.

In one embodiment, either of content generation platform 110 and/or content consumer platform 130 can include, a single processor desktop system, a multiprocessor workstation system, or a server system having a large number of processors (e.g., CPU 111, 131) or processor cores. In one embodiment, the content generation platform 110 and/or content consumer platform 130 can be a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, either of content generation platform 110 and/or content consumer platform 130 couple with, or be integrated within: a server-based gaming platform; a game console, including a game and media console; a mobile gaming console, a handheld game console, or an online game console. In some embodiments the content generation platform 110 and/or content consumer platform 130 is part of a mobile phone, smart phone, tablet computing device or mobile Internet-connected device such as a laptop with low internal storage capacity. Content generation platform 110 and/or content consumer platform 130 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the content generation platform 110 and/or content consumer platform 130 includes or is part of a television or set top box device. In one embodiment, content generation platform 110 and/or content consumer platform 130 can include, couple with, or be integrated within a self-driving vehicle such as a bus, tractor trailer, car, motor or electric power cycle, plane or glider (or any combination thereof). The self-driving vehicle may use content generation platform 110 and/or content consumer platform 130 to process the environment sensed around the vehicle.

In some embodiments, the content generation platform 110 and/or content consumer platform 130 include one or more processors, such as central processing unit (CPU) 111, 131, which each include one or more processor cores to process instructions which, when executed, perform operations for system or user software. In some embodiments, at least one of the one or more processor cores is configured to process a specific instruction set. In some embodiments, instruction set may facilitate Complex Instruction Set Computing (CISC), Reduced Instruction Set Computing (RISC), or computing via a Very Long Instruction Word (VLIW). One or more processor cores may process a different instruction set which may include instructions to facilitate the emulation of other instruction sets. Processor core may also include other processing devices, such as a Digital Signal Processor (DSP).

Content generation platform 110 includes one or more processors, such as a CPU 111, wherein the content generation platform 110 provides for processing of machine learning (ML) data. The ML processing may include at least some portion of the processing to be performed on a hardware accelerator 115, which is shown as including an ML model 116 for training or inference. An ML model may also be referred to herein as an AI model.

As used herein, "hardware accelerator" refers to a hardware device structured to provide for efficient processing. In particular, a hardware accelerator may be utilized to provide for offloading of certain processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), neural processing unit, AI (Artificial Intelligence) processor, field programmable gate array (FPGA), or application-specific integrated circuit (ASIC).

In one implementation, content generation platform 110 provides for processing of ML data to generate content for consumption by content consumer platform 130. The generated content may be multi-modal content, including, but not limited to, one or more of plaintext, image(s), video(s), audio, and/or any other form of content. Content consumer platform 130 includes one or more processors, such as a CPU 131, where the content generation platform 110 provides for consumption of content generated by a content generation platform, such as content generated by processing of the ML data via ML model 116 at content generation platform 110. Consumption of content may include publishing content to a web page, adding the content into a monitoring system, or other processing of the content, for example. Content consumer platform 130 may include a content consumer component 134 (e.g., provided via CPU 131) that facilitates consumption of the content. For example, content consumer component 134 may include, but is not limited to, a web browser application, a mobile device application, a media player, a monitoring system, and so on.

A conventional system or process may implement algorithmic methods to detect and thwart adversarial attacks on the ML processing performed by the content generation platform 110, but this is insufficient to provide adequate protection from sophisticated adversarial attacks. In some embodiments, a system or process is to provide immutable watermarking for authenticating and verifying AI-generated output. In one implementation, the AI-generated output may refer to the content generated from processing the ML data via an inference stage of the ML model 116 at the content generation platform 110.

In one implementation, content generation platform 110 may provide a content generator 112 that generates multi-modal content, such as text, an image, a video, audio, or any other form of content. The content generator 112 may be implemented via hardware, software, and/or firmware of the content generation platform 110. The content generator 112 may utilize an ML model 116 to generate the content. For example, content generator 112 may utilize an inference stage of ML model 116 to generate text for publication to a document, such as a web page published to the Internet. In another example, content generator 112 may utilize an inference stage of ML model 116 to identify subject matter in a video for entry into a monitoring system, such as identification of an event recorded by a surveillance device. Other implementations of content generation for various use cases are envisioned in embodiments of the disclosure.

In implementations of the disclosure, the content generation platform utilizes a global unique identifier (GUID) to authenticate and validate the output of the ML model 116 by content generator 112. The GUID authenticates an identity of the ML model 116. Implementations of the disclosure include the GUID as part of a digital signature that is sent with the content to the content consumer platform 130. The content consumer platform 130 can utilize the GUID, as extracted from the received digital signature, in order to verify authenticity of the received content and, in particular, verify authenticity of the author (e.g., ML model 116, etc.) of the content. In some implementations, the digital signature includes a fusion of the generated content with model identification (including the GUID).

In some implementations, manual content generators (e.g., humans) are assigned a generic GUID, in order to perform the differentiation between a manual content generator (e.g., human) and an AI model. In some implementations, manual content generators are each assigned a unique GUID in order to differentiate individual provenance among manual content generators. The GUIDs are confidential and may be generated for purposes of assignment to an AI model or manual content generator.

Implementations of the disclosure implement a watermarking approach (i.e., watermarking pipeline) based on three components to facility traceability of data origin of content. Watermarking as discussed herein refers to the utilization of digital information hidden in a signal that can be used to verify the authenticity or integrity of the owner. The three components of implementations of the disclosure used in the watermarking approach include a sender, a verifier, and a shared AI registry. The three components may each be provided by a trusted entity and, as such, are considered individual trusted entities themselves. In one implementation, the sender may be one or more of the hash generator 113 and/or content deployer 114 of content generation platform 110. In one implementation, the verifier may be a verification component 132 of the content consumer platform 130. In one implementation, the shared AI registry may be the shared AI registry 120 of system 100.

With respect to the sender component, the hash generator 113 and/or content deployer 114 may be implemented in CPU 111 of content generation platform 110 as hardware, software, and/or firmware of the content generation platform 110. Once content is generated by content generator 112, the hash generator 113 may utilize the ML model's 116 GUID, a ML model ID, the content (e.g., plain text, image, video, etc.), and/or a timestamp for a digital signature. The content deployer 114 may then transmit the digital signature to the verifier component, along with the content (e.g., plain text, image, video, etc.), timestamp, and model ID. In one implementation, the digital signature and content, timestamp, and model ID may be sent over an insecure communication channel 140 to the verifier (e.g., verification component 132).

With respect to the verifier, the verification component 132 may be implemented in CPU 131 of content consumer platform 130 as hardware, software, and/or firmware of the content consumer platform 130. The verification component 132 verifies the digital signature of content to prove 1) if the content generation platform 110 and/or content generator 112 may have tampered the content and 2) if the content is from an ML model 116 with a unique GUID. In order to verify the content, the verification component 132 may utilize, in the case of content consumer component 134 being a web browser application, the previously downloaded public key of the website and the GUID, which is cached locally (e.g., at storage memory devices 118, 138) or sent from the sender to the verifier via a secure transmission channel 150.

The shared AI registry 120 maintains the record of the ML models' GUIDs indexed by model IDs 125. In one implementation, a model developer or model deployer could be responsible for generating the GUIDs and establishing the shared AI registry 120. The central location for the shared AI registry 120 may be provided by Internet Service Providers (ISPs) and/or Cloud Service Providers (CSPs) that could act as trusted entities. In particular, CSPs offer the building blocks for trusted environment and could serve a larger role in the pipeline. Implementations of the disclosure may be implemented for inference (i.e., ML models ready to be deployed), and the model developer can be assumed to be trustworthy during model training (i.e., the model developer does not introduce backdoors or unintended effects during training) and release.

In some implementations, the hash generator 113 and/or the verification component 132 can use a hash-based MAC (HMAC), which is a keyed hashing mechanism, as a basis for the digital signature. In the case of an HMAC, the GUID can act as key and at the same time uniquely identify the AI model that it is associated with. Other functions, such as PBKDF2, that are based on HMAC could also be used as well. As noted previously, the GUID can be sent from the sender (e.g., hash generator 113) to the verifier (e.g., verification component 132) through a secure transmission channel 150.

Implementations of the disclosure may be used in situations where the AI user/publisher (e.g., content generation platform 110) is present and can use the AI (e.g., ML model 116) to generate content that consumers perceive as trustworthy. For example, the use case of autonomous generation and publication of AI-generated text without utilizing a starting seed may implement aspects of the disclosure to enable differentiating between whether a human or AI authored the text, as well as determining which particular AI model authored the text. This may assist in determining output data lineage. Implementations of the disclosure may also be utilized in an Internet of Things (IoT) setting, where the data lineage of data generated by AI models (e.g., ML model 116) on edge devices can be identified without having to transmit details about the intrinsic implementation of the AI model, as described above. Further discussion of these particular use cases is provided with respect to FIGS. 2 and 3 below.

Figure 2:
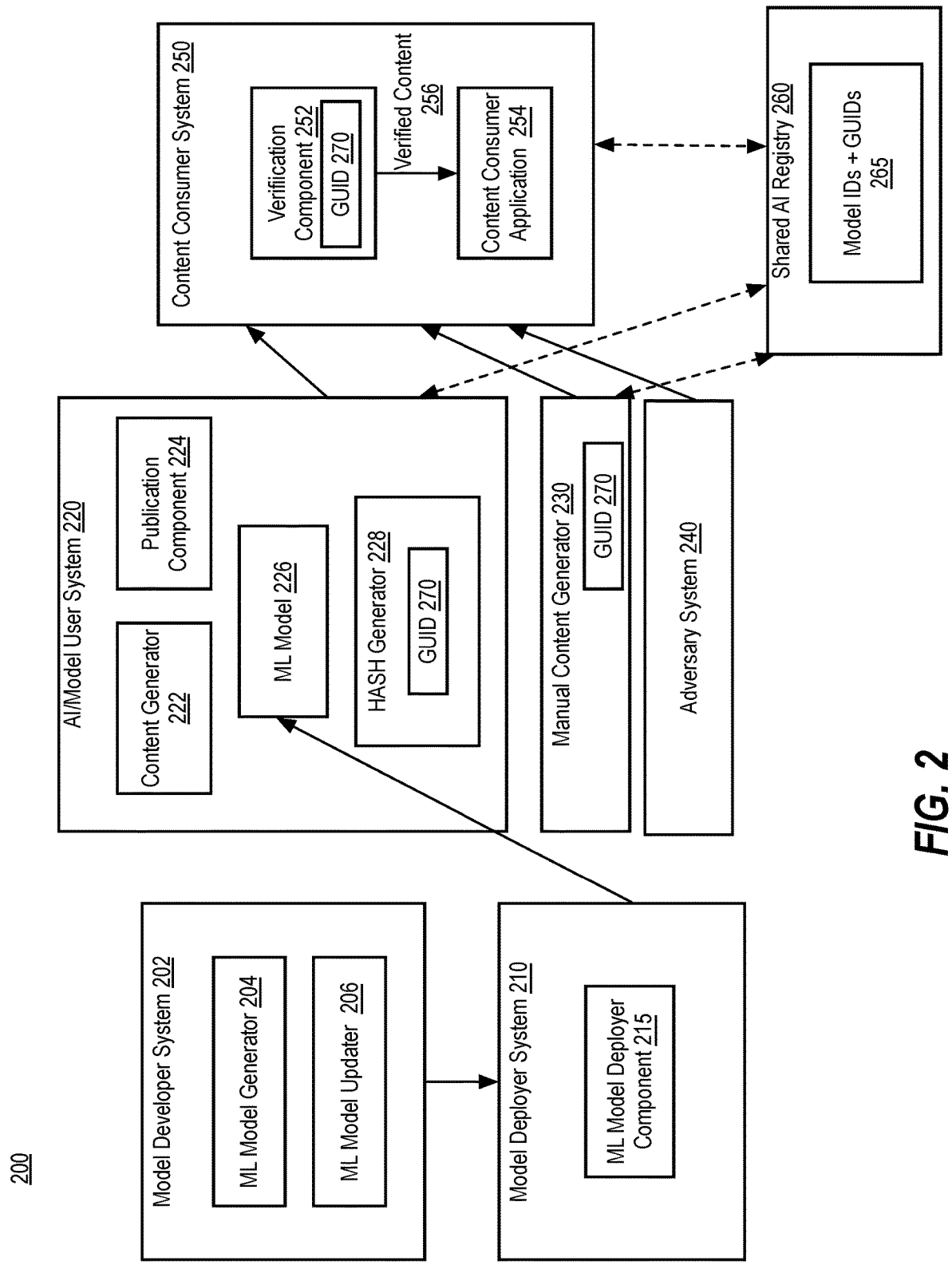
FIG. 2 is an illustration of elements to provide immutable watermarking for authenticating and verifying AI-generated output according to some embodiments.

FIG. 2 is an illustration of a system 200 to provide immutable watermarking for authenticating and verifying AI-generated output in an example news consumption application, according to some embodiments. System 200 may include similar components as system 100 described with respect to FIG. 1 and their corresponding description above is similarly applied with respect to system 200.

System 200 implements a watermarking approach (i.e., watermarking pipeline) to facilitate traceability of data origin with respect to autonomous generation and publication of AI-generated text. For example, system 200 may reflect a news consumption use case. System 200 includes a model developer system 202, a model deployer system 210, an AI/model user system 220, a manual content generator 230, an adversary system 240, a content consumer system 250, and a shared AI registry 260.

The model developer system 202 may include an ML model generator 204 and a ML model updater 206. The ML model generator 204 may train and generate an ML model (e.g., ML model 116 of FIG. 1) for deployment in an ecosystem. The ML model updater 206 may be responsible for updating training of the generated ML model. In implementations of the disclosure, the model developer system 202 is assumed to be trustworthy during model training (i.e., the model developer does not introduce backdoors or unintended effects during training) and model release.

The ML model generated and/or updated by model developer system 202 may be provided to model deployer system 210. Model deployer system 210 includes an ML model deployer component 215 that can host the ML model for inference purposes. The model deployer system 210 may host the ML model using machine learning-as-a-service. In some implementation, the model deployer system may not collaborate with the model developer system 202 to host the ML model.

The ML model deployer component 215 can make the ML model 226 available to an AI/model user system 220 for inference. The AI/model user system 220 may implement content generator 222 to provide the starting text for the trained model 226 to make inferences, and optionally takes the output of the ML model 226 and publishes it via publication component 224. The publication component 224 may publish the output to a web page, for example.

The publication component may communicate with content consumer system 250 to cause the output of the ML model 226 to be published. For example, content consumer system 250 may be a computing device hosting a content consumer application 254, such as a web browser or other content application, that causes publication of content for consumption by an end user.

In some implementations, a manual content generator 230 may also publish content for consumption at content consumer system 250. The manual content generator 230 may provide content directly generated by a manual user, such as a human user, as opposed to content generated by an AI model.

In some implementations, an adversary system 240 may also publish content using an AI model, but in a manner that tricks a content consumer into believing the content is from a reputable human source or a legitimate AI model.

Implementations of the disclosure provide a watermarking approach to verify the authenticity or integrity of the owner of content published and consumed at content consumer system 250. The watermarking approach prevents the publishing and/or consumption of unverified content at the content consumer system 250. As such, content generated by the adversary system 240 that is not verifiable at the content consumer system 250 is not published and/or consumed at the content consumer system 250.

In implementations of the disclosure, a GUID 270 is used to authenticate and validate content provided for consumption at content consumer system 250. The content consumer system 250 may include a verification component 252 that verifies whether content received at the content consumer system 250 is associated with an authenticated GUID 270. If so, the content is considered to be verified content 256 that can be provided for content consumer application 254 for user consumption. In one implementation, the verification component 252 is the same as verification component 132 described with respect to FIG. 1. In some implementations, if the verification component 252 is not able to locate and/or verify a GUID associated with received content, then the verification component 252 may refuse the content for purposes of consumption at content consumer application 254.

When content is generated for publication at the AI/model user system 220, a hash generator 228 can be used to generate a digital signature for the generated content, where the digital signature includes at least the GUID 270. In one implementation, the hash generator 228 is the same as hash generator 113 described with respect to FIG. 1. The hash generator 228 may be a trusted component that is provided for hosting by the AI/model user system 220 from a trusted entity. Similarly, the verification component 252 may also be a trusted component that is provided for hosting by the content consumer system 250 from a trusted entity.

The hash generator 228 may utilize a GUID 270 corresponding to the ML model when generating the digital signature. The GUID 270 may be obtained by the hash generator 228 from the shared AI registry 260. In one implementation, the shared AI registry 260 is the same as shared AI registry 120 described with respect to FIG. 1 and maintains a data store 265 of ML models' GUIDs indexed by model IDs, for example. In one implementation, the model developer system 202 or model deployer system 210 could be responsible for generating the GUIDs 270 for various ML models (Such as ML model 226) and/or manual content generators (such as manual content generator 230) and establishing the shared AI registry 260. As previously discussed, the shared AI registry 260 may be provided in a central location by ISPs and/or CSPs that act as trusted entities. As noted previously, the GUID 270 can be obtained at the hash generator 228 from the shared AI registry 260. In some implementations, the hash generator 228 may send the GUID 270 to the verification component 252 through a secure transmission channel. In some implementation, the verification component 252 may obtain the GUID 270 from the shared AI registry 260.

In one implementation, the digital signature generated by hash generator 228 may be a hash of one or more the generated content (e.g., plaintext), the GUID 270, a ML model ID, and/or a timestamp. In some implementations, the hash generator 228 can use a HMAC to generate the digital signature. Once the digital signature is generated by hash generator 228, the publication component 224 may then transmit the digital signature, along with the content (e.g., plain text), timestamp, and model ID to the content consumer system 250. In one implementation, the digital signature and content, timestamp, and model ID may be sent over an insecure communication channel to the content consumer system 250.

As previously discussed, the verification component 252 of content consumer system 250 verifies the digital signature of content prior to passing it to content consumer application 254 as verified content 256. Verification of the content by verification component 252 is performed to determine 1) if provider of the content (e.g., AI/model user system 220, manual content generator 230, adversary system 240) may have tampered the content and 2) if the content is from an ML model (e.g., ML model 226) or other author (e.g., manual content generator 230) with a unique GUID 270. In order to verify the content, the verification component 252 may utilize a previously downloaded public key of a website and the GUID 270. As previously noted, the GUID 270 may be cached locally at the content consumer system 250 (e.g., subsequent to being provided from the hash generator 228) or obtained from the shared AI registry 260. As shown in FIG. 2, if adversary system 240 provides content to content consumer system 250 without a verifiable GUID, the verification component 252 determines that the received content is not associated with a valid GUID and can refuse the content for purposes of consumption at the content consumer application 254. In some implementations, the verification component 252 might still allow the content for consumption at content consumer application 254 but may provide a notification and/or warning with the content indicating that the content is not associated with a verified source.

Figure 3:
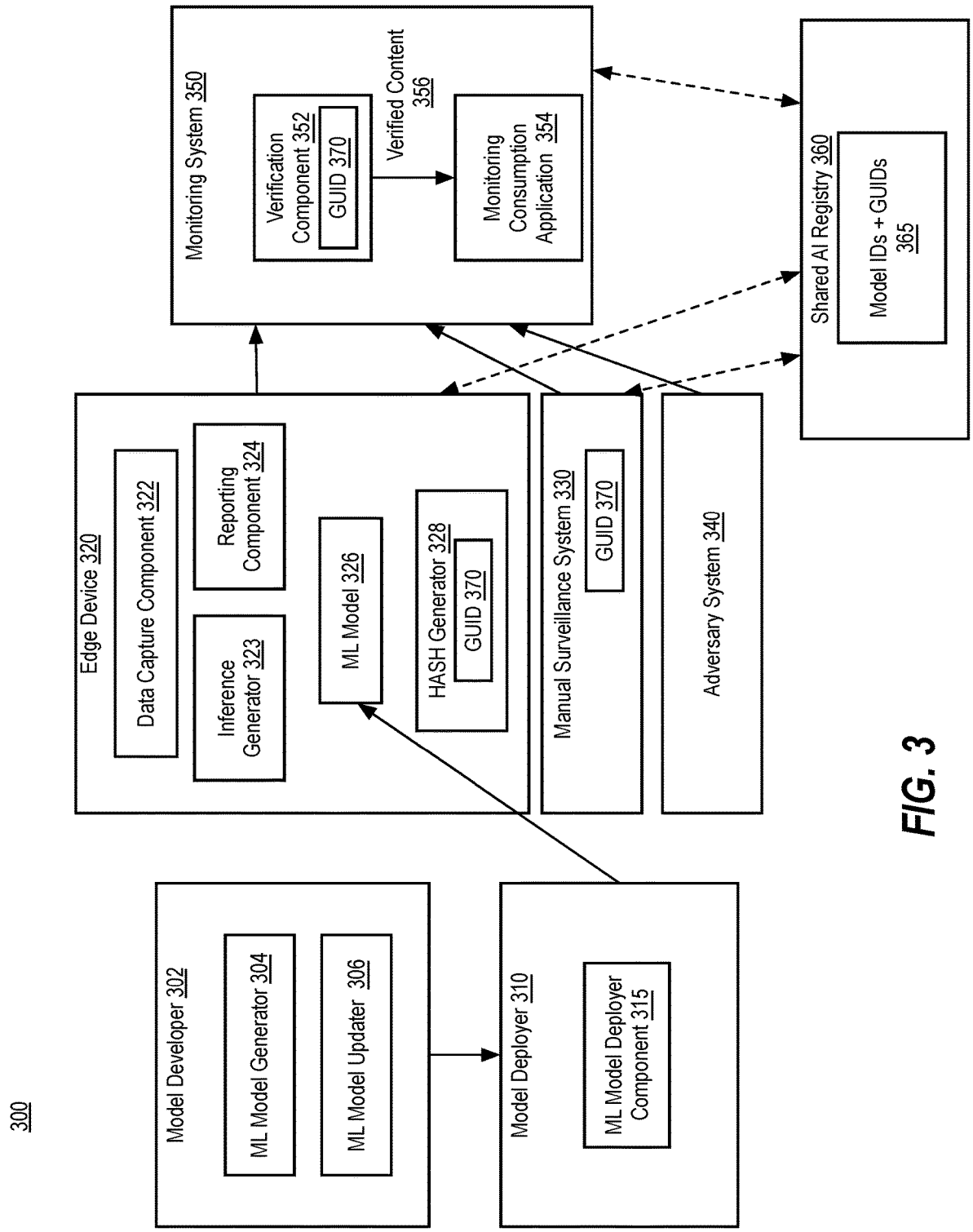
FIG. 3 is an illustration of a system architecture to provide immutable watermarking for authenticating and verifying AI-generated output according to some embodiments.

FIG. 3 is an illustration of a system 300 to provide immutable watermarking for authenticating and verifying AI-generated output in an example digital monitoring application, according to some embodiments. System 300 may include similar components as system 100 described with respect to FIG. 1 and/or system 200 described with respect to FIG. 2. As such, the corresponding descriptions from FIGS. 1 and 2 above is similarly applied with respect to system 300.

System 300 implements a watermarking approach (i.e., watermarking pipeline) to facilitate traceability of origin of content with respect to digital monitoring systems. For example, system 300 may reflect a digital surveillance use case. System 300 includes a model developer system 302, a model deployer system 310, an edge device 320, a manual surveillance system 330, an adversary system 340, a monitoring system 350, and a shared AI registry 360.

The model developer system 302 may include an ML model generator 304 and a ML model updater 306. The ML model generator 304 may train and generate an ML model (e.g., ML model 116 of FIG. 1) for deployment in an ecosystem, such as an ML model that can identify certain events typical to a digital surveillance ecosystem. The ML model updater 306 may be responsible for updating training of the generated ML model. In implementations of the disclosure, the model developer system 302 is assumed to be trustworthy during model training (i.e., the model developer does not introduce backdoors or unintended effects during training) and model release.

The ML model generated and/or updated by model developer system 302 may be provided to model deployer system 310. Model deployer system 310 includes an ML model deployer component 315 that can host the ML model for inference purposes. The model deployer system 310 may host the ML model using machine learning-as-a-service. In some implementation, the model deployer system may not collaborate with the model developer system 302 to host the ML model.

The ML model deployer component 315 can make the ML model 326 available to an edge device 320 for inference. The edge device 320 may include a data capture component 322 to capture images, audio, and/or video content as part of monitoring an environment. The inference generator 323 may analyze the captured images, audio, and/or video from the data capture component 322 and apply the ML model 326 to such content to make inferences on the captured content. The inference generator 323 may optionally takes the output of the ML model 326 and publishes it via reporting component 324. The reporting component 324 may report the output of the inferences of ML model 326 to a monitoring system for logging, for example.

The reporting component 324 may communicate with monitoring system 350 to cause the output of the ML model 326 to be recorded. For example, monitoring system 250 may be a computing device hosting a monitoring consumption application 354 that causes logging of monitored events for analysis and review (e.g., consumption) by an end user.

In some implementations, a manual surveillance system 330 may also generate content for consumption at monitoring system 350. The manual surveillance system 330 may provide content directly generated by a manual user, such as a human user, as opposed to content generated by an AI model (such as ML model 326).

In some implementations, an adversary system 340 may also generate content using an AI model or otherwise, but in a manner that tricks a content consumer into believing the content is from a reputable human source or a legitimate AI model.

Implementations of the disclosure provide a watermarking approach to verify the authenticity or integrity of the owner of content reported and consumed at monitoring system 350. The watermarking approach prevents the reporting and/or consumption of unverified content at the monitoring system 350. As such, content generated by the adversary system 340 that is not verifiable at the monitoring system 350 is not reported, logged, and/or consumed at the monitoring system 250.

In implementations of the disclosure, a GUID 370 is used to authenticate and validate content provided for consumption at monitoring system 350. The monitoring system 350 may include a verification component 352 that verifies whether content received at the monitoring system 350 is associated with an authenticated GUID 270. If so, the content is considered to be verified content 356 that can be provided for monitoring consumption application 354 for user consumption. In one implementation, the verification component 352 is the same as verification component 132 described with respect to FIG. 1. In some implementations, if the verification component 352 is not able to locate and/or verify a GUID associated with received content, then the verification component 352 may refuse the content for purposes of consumption at monitoring consumption application 354.

When content is generated for reporting at the edge device 320, a hash generator 328 can be used to generate a digital signature for the generated content, where the digital signature includes at least the GUID 370. In one implementation, the hash generator 328 is the same as hash generator 113 described with respect to FIG. 1. The hash generator 328 may be a trusted component that is provided for hosting by the edge device 320 from a trusted entity. Similarly, the verification component 352 may also be a trusted component that is provided for hosting by the monitoring system 350 from a trusted entity.

The hash generator 328 may utilize a GUID 370 corresponding to the ML model 326 when generating the digital signature. The GUID 370 may be obtained by the hash generator 328 from the shared AI registry 360. In one implementation, the shared AI registry 360 is the same as shared AI registry 120 described with respect to FIG. 1 and maintains a data store 365 of ML models' GUIDs indexed by model IDs, for example. In one implementation, the model developer system 302 or model deployer system 310 could be responsible for generating the GUIDs 370 for various ML models (such as ML model 326) and/or manual content generators (such as manual surveillance system 330) and establishing the shared AI registry 360. As previously discussed, the shared AI registry 360 may be provided in a central location by ISPs and/or CSPs that act as trusted entities. As noted previously, the GUID 370 can be obtained at the hash generator 328 from the shared AI registry 360. In some implementations, the hash generator 328 may send the GUID 370 to the verification component 352 through a secure transmission channel. In some implementation, the verification component 352 may obtain the GUID 370 from the shared AI registry 360.

In one implementation, the digital signature generated by hash generator 328 may be a hash of one or more the generated content (e.g., image, video, audio, etc.), the GUID 370, a ML model ID, and/or a timestamp. In some implementations, the hash generator 328 can use a HMAC to generate the digital signature. Once the digital signature is generated by hash generator 328, the reporting component 324 may then transmit the digital signature, along with the content (e.g., image, video, etc.), timestamp, and model ID to the monitoring system 350. In one implementation, the digital signature and content, timestamp, and model ID may be sent over an insecure communication channel to the monitoring system 350.

As previously discussed, the verification component 352 of monitoring system 350 verifies the digital signature of content prior to passing it to monitoring consumption application 354 as verified content 356. Verification of the content by verification component 352 is performed to determine 1) if provider of the content (e.g., edge device 320, manual surveillance system 330, adversary system 340) may have tampered the content and 2) if the content is from an ML model (e.g., ML model 326) or other author (e.g., manual surveillance system 330) with a unique GUID 370. In order to verify the content, the verification component 352 may utilize the GUID 370. As previously noted, the GUID 370 may be cached locally at the monitoring system 350 (e.g., subsequent to being provided from the hash generator 328) or obtained from the shared AI registry 360. As shown in FIG. 3, if adversary system 340 provides content to monitoring system 350 without a verifiable GUID, the verification component 352 determines that the received content is not associated with a valid GUID and can refuse the content for purposes of consumption at the monitoring consumption application 354. In some implementations, the verification component 352 might still allow the content for consumption at monitoring consumption application 354 but may provide a notification and/or warning with the content indicating that the content is not associated with a verified source.

Figure 4:
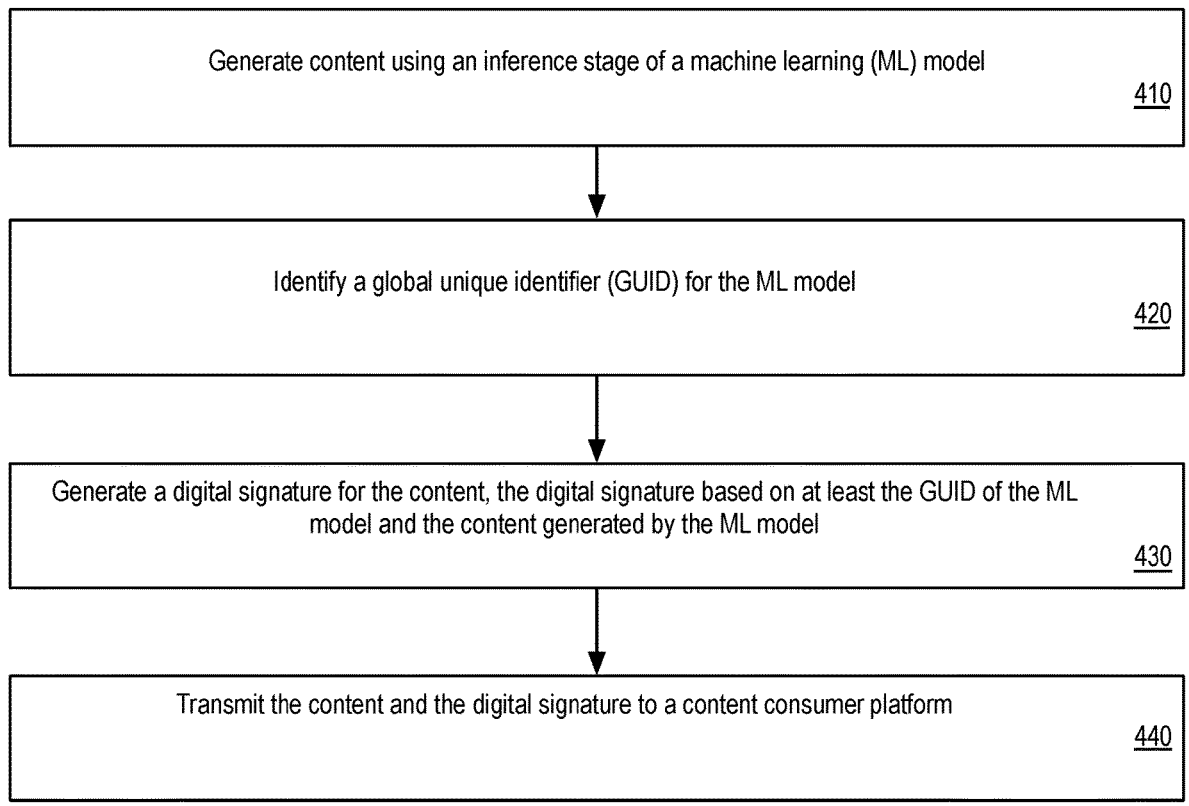
FIG. 4 is an illustration of a system architecture to provide immutable watermarking for authenticating and verifying AI-generated output according to some embodiments.

FIG. 4 illustrates an example flow 400 for immutable watermarking for authenticating and verifying AI-generated output by a content generation platform, in accordance with certain embodiments. The various operations of the flow may be performed by any suitable circuitry, such as a controller of a host computing device, a controller of a memory module, or other components of a computing device. The example flow 400 may be representative of some or all the operations that may be executed by or implemented on one or more components of system 100 of FIG. 1, such as a processor (e.g., CPU 111). The embodiments are not limited in this context.

At block 410, the processor may generate content using an inference stage of an ML model. At block 420, the processor may identify a global unique identifier (GUID) for the ML model.

Subsequently, at block 430, the processing may generate a digital signature for the content, the digital signature based on at least the GUID of the ML model and the content generated by the ML model. Lastly, at block 440, the processor may transmit the content and the digital signature to a content consumer platform.

Some of the operations illustrated in FIG. 4 may be repeated, combined, modified or deleted where appropriate, and additional steps may also be added to the flow in various embodiments. Additionally, steps may be performed in any suitable order without departing from the scope of particular embodiments.

FIG. 5 illustrates an example flow 500 for immutable watermarking for authenticating and verifying AI-generated output by a content consumption platform, in accordance with certain embodiments. The flow 500 may be representative of some or all the operations that may be executed by or implemented on one or more components of system 100 of FIG. 1, such as a processor (e.g., CPU 131). The embodiments are not limited in this context.

In the illustrated embodiment shown in FIG. 5, the flow 500 may begin at block 510. At block 510, the processor may receive, by a processor of a content consumer platform, content generated by a machine learning (ML) model and a digital signature corresponding to the content. At block 520, the processor may process the digital signature to extract, from the digital signature, a global unique identifier (GUID) of the ML model that generated the content.

Subsequently, at block 530, the processor may verify the extracted GUID against data obtained from a shared registry, the data obtained from the shared registry comprising identifying information of the ML model including the GUID. At decision block 540, the processor determine whether the extracted GUID is successfully verified.

If the extracted GUID is successfully verified at decision block 540, the flow 500 proceeds to block 550 where the processor may provide the content for consumption at the content consumer platform and indicating that the content is generated by the ML model having verified authenticity. On the other hand, if the extracted GUID is not successfully verified at decision block 540, the flow 500 proceeds to block 560 where the processor may refuse the content for consumption at the content consumer platform and indicate that the ML model generating the content is not verified for authenticity.

Some of the operations illustrated in FIG. 5 may be repeated, combined, modified or deleted where appropriate, and additional steps may also be added to the flow in various embodiments. Additionally, steps may be performed in any suitable order without departing from the scope of particular embodiments.

Figure 6:
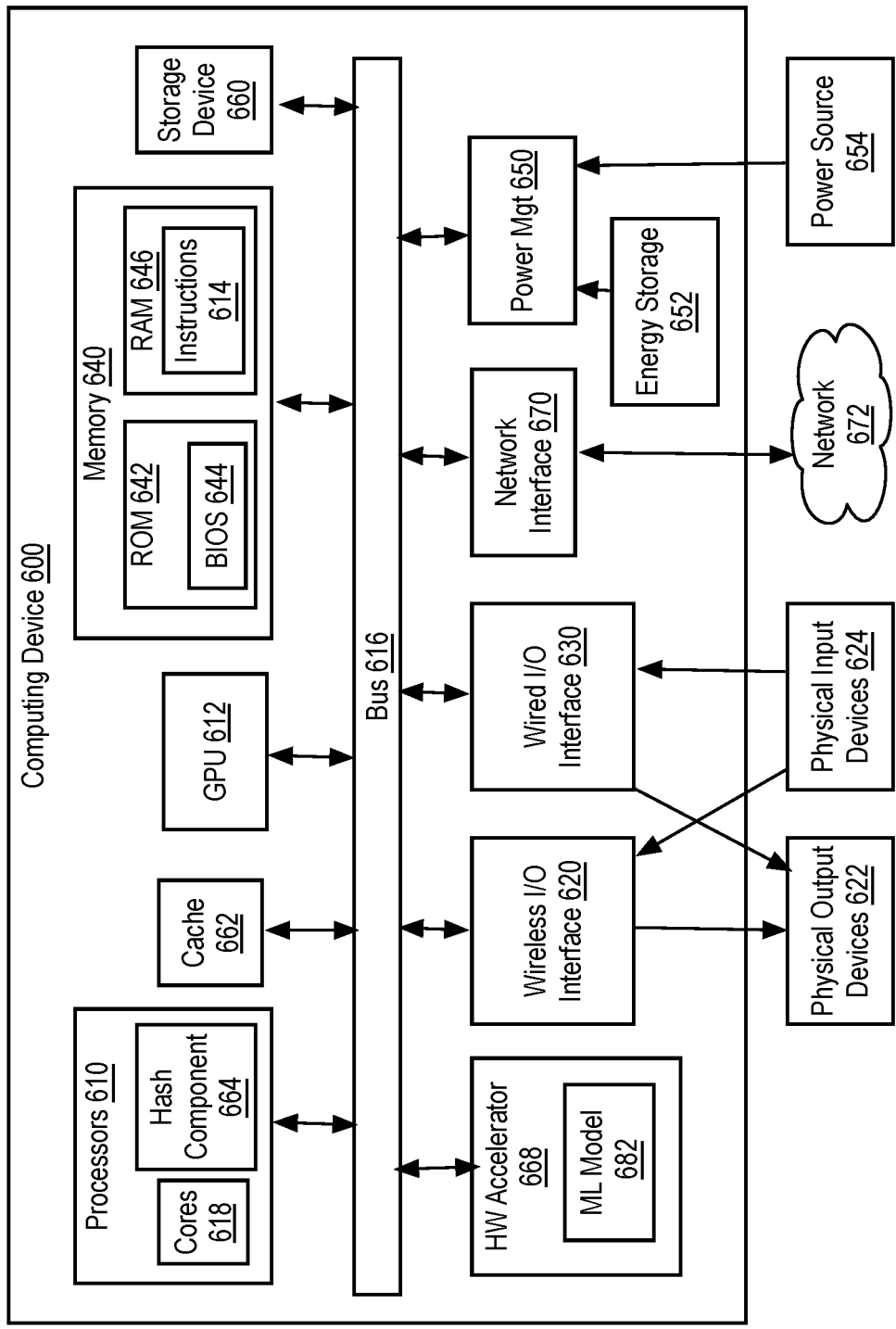
FIG. 6 is a schematic diagram of an illustrative electronic computing device to enable immutable watermarking for authenticating and verifying AI-generated output according to some embodiments.

FIG. 6 is a schematic diagram of an illustrative electronic computing device to enable immutable watermarking for authenticating and verifying AI-generated output according to some embodiments. In some embodiments, the computing device 600 includes one or more processors 610 including one or more processors cores 618 and hash component 664, such as hash generator 113 or verification component 132 described with respect to FIG. 1. In some embodiments, the computing device 600 includes a hardware accelerator 668, the hardware accelerator including a ML model 682. In some embodiments, the computing device is to provide immutable watermarking for authenticating and verifying AI-generated output, as provided in FIGS. 1-5.

The computing device 600 may additionally include one or more of the following: cache 662, a graphical processing unit (GPU) 612 (which may be the hardware accelerator in some implementations), a wireless input/output (I/O) interface 620, a wired I/O interface 630, system memory 640 (e.g., memory circuitry), power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks are not described in further detail herein, as they should be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

The following examples pertain to further embodiments. Example 1 is a system to facilitate immutable watermarking for authenticating and verifying AI-generated output. The system of Example 1 comprises a hardware accelerator to perform processing related to a machine learning (ML) model; and one or more processors including a hash generator. In Example 1 the hash generator is to identify a global unique identifier (GUID) for the ML model; generate a digital signature for content generated by an inference stage of the ML model, the digital signature based on at least the GUID of the ML model and the content generated by the ML model; and transmit the content and the digital signature to a content consumer platform.

In Example 2, the subject matter of Example 1 can optionally include wherein the GUID comprises a unique identifier of the ML model that corresponds to a model identifier (ID) of the ML model, and wherein the GUID is maintained by a trusted entity comprising a shared registry that is separate from the system. In Example 3, the subject matter of any one of Examples 1-2 can optionally include wherein the GUID is received via a secure transmission channel from the shared registry.

In Example 4, the subject matter of any one of Examples 1-3 can optionally include wherein the digital signature is utilized to verify authenticity of the ML model generating the content at the content consumer platform, and wherein the content consumer platform verifies the GUID using a secure transmission channel to the shared registry. In Example 5, the subject matter of any one of Examples 1-4 can optionally include wherein the digital signature is further based on a model identifier (ID) of the ML model.

In Example 6, the subject matter of any one of Examples 1-5 can optionally include wherein the digital signature is further based on a timestamp corresponding to generation of the content. In Example 7, the subject matter of any one of Examples 1-6 can optionally include wherein the digital signature comprises a hash-based message authentication code (HMAC) of the content and the GUID.

In Example 8, the subject matter of any one of Examples 1-7 can optionally include wherein the one or more processors include a central processing unit (CPU). In Example 9, the subject matter of any one of Examples 1-8 can optionally include wherein the hardware accelerator includes a graphics processing unit (GPU).

Example 10 is a non-transitory machine readable storage medium for facilitating immutable watermarking for authenticating and verifying AI-generated output. The non-transitory machine readable storage medium of Example 10 having stored thereon executable computer program instructions that, when executed by one or more processors, cause the one or more processors to perform operations comprising: identifying a global unique identifier (GUID) for a machine learning (ML) model; generating a digital signature for content generated by an inference stage of the ML model, the digital signature based on at least the GUID of the ML model and the content generated by the ML model; and transmitting the content and the digital signature to a content consumer platform.

In Example 11, the subject matter of Example 10 can optionally include wherein the GUID comprises a unique identifier of the ML model that corresponds to a model identifier (ID) of the ML model, and wherein the GUID is maintained by a trusted entity comprising a shared registry. In Example 12, the subject matter of Examples 10-11 can optionally include wherein the digital signature is utilized to verify authenticity of the ML model generating the content at the content consumer platform, and wherein the content consumer platform verifies the GUID using a secure transmission channel to the shared registry. In Example 13, the subject matter of Examples 10-12 can optionally include wherein the digital signature is further based on a model identifier (ID) of the ML model.

In Example 14, the subject matter of Examples 10-13 can optionally include wherein the digital signature is further based on a timestamp corresponding to generation of the content. In Example 15, the subject matter of Examples 10-14 can optionally include wherein the digital signature comprises a hash-based message authentication code (HMAC) of the content and the GUID.

Example 16 is a method for facilitating immutable watermarking for authenticating and verifying AI-generated output. The method of Example 20 can include receiving, by a processor of a content consumer platform, content generated by a machine learning (ML) model and a digital signature corresponding to the content; processing the digital signature to extract, from the digital signature, a global unique identifier (GUID) of the ML model that generated the content; verifying the extracted GUID against data obtained from a shared registry, the data obtained from the shared registry comprising identifying information of the ML model including the GUID; and in response to successfully verifying the extracted GUID, providing the content for consumption at the content consumer platform and indicating that the content is generated by the ML model having verified authenticity.

In Example 17, the subject matter of Example 16 can optionally include wherein the GUID comprises a unique identifier of the ML model that corresponds to a model identifier (ID) of the ML model. In Example 18, the subject matter of any one of Examples 16-17 can optionally include wherein the shared registry comprises a trusted entity that is separate from the content consumer platform. In Example 19, the subject matter of any one of Examples 16-18 can optionally include wherein the digital signature comprises a hash-based message authentication code (HMAC) of the content and the GUID. In Example 20, the subject matter of any one of Examples 16-19 can optionally include wherein the digital signature comprises a hash-based message authentication code (HMAC) of the content, the GUID, a model identifier (ID) of the ML model, and a timestamp corresponding to generation of the content.

Example 21 is an apparatus to facilitate immutable watermarking for authenticating and verifying AI-generated output. The apparatus of Example 21 comprises and one or more processors including a hash generator. In Example 21 the hash generator is to identify a global unique identifier (GUID) for a machine learning (ML) model; generate a digital signature for content generated by an inference stage of the ML model, the digital signature based on at least the GUID of the ML model and the content generated by the ML model; and transmit the content and the digital signature to a content consumer platform.

In Example 22, the subject matter of Example 21 can optionally include wherein the GUID comprises a unique identifier of the ML model that corresponds to a model identifier (ID) of the ML model, and wherein the GUID is maintained by a trusted entity comprising a shared registry that is separate from the system. In Example 23, the subject matter of any one of Examples 21-22 can optionally include wherein the GUID is received via a secure transmission channel from the shared registry.

In Example 24, the subject matter of any one of Examples 21-23 can optionally include wherein the digital signature is utilized to verify authenticity of the ML model generating the content at the content consumer platform, and wherein the content consumer platform verifies the GUID using a secure transmission channel to the shared registry. In Example 25, the subject matter of any one of Examples 21-24 can optionally include wherein the digital signature is further based on a model identifier (ID) of the ML model.

In Example 26, the subject matter of any one of Examples 21-25 can optionally include wherein the digital signature is further based on a timestamp corresponding to generation of the content. In Example 27, the subject matter of any one of Examples 21-26 can optionally include wherein the digital signature comprises a hash-based message authentication code (HMAC) of the content and the GUID.

In Example 28, the subject matter of any one of Examples 21-27 can optionally include wherein the one or more processors include a central processing unit (CPU). In Example 29, the subject matter of any one of Examples 21-28 can optionally include wherein the one or more processors include a graphics processing unit (GPU).

Example 30 is an apparatus for facilitating immutable watermarking for authenticating and verifying AI-generated output according to implementations of the disclosure. The apparatus of Example 30 can comprise means for receiving, by a processor of a content consumer platform, content generated by a machine learning (ML) model and a digital signature corresponding to the content; means for processing the digital signature to extract, from the digital signature, a global unique identifier (GUID) of the ML model that generated the content; means for verifying the extracted GUID against data obtained from a shared registry, the data obtained from the shared registry comprising identifying information of the ML model including the GUID; and means for providing, in response to successfully verifying the extracted GUID, the content for consumption at the content consumer platform and indicating that the content is generated by the ML model having verified authenticity. In Example 31, the subject matter of Example 30 can optionally include the apparatus further configured to perform the method of any one of the Examples 17 to 20.

Example 32 is at least one machine readable medium comprising a plurality of instructions that in response to being executed on a computing device, cause the computing device to carry out a method according to any one of Examples 16-20. Example 33 is an apparatus for facilitating immutable watermarking for authenticating and verifying AI-generated output, configured to perform the method of any one of Examples 16-20. Example 34 is an apparatus for facilitating immutable watermarking for authenticating and verifying AI-generated output comprising means for performing the method of any one of claims 16 to 20. Specifics in the Examples may be used anywhere in one or more embodiments.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium (e.g., non-transitory computer-readable storage medium) having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. A system comprising:
   a hardware accelerator to perform processing related to a machine learning (ML) model; and
   one or more processors including a hash generator to:
      identify a global unique identifier (GUID) for the ML model;
      generate a digital signature for content generated by an inference stage of the ML model, the digital signature based on at least the GUID of the ML model and the content generated by the ML model; and
      transmit the content and the digital signature to a content consumer platform.

2. The system of claim 1, wherein the GUID comprises a unique identifier of the ML model that corresponds to a model identifier (ID) of the ML model, and wherein the GUID is maintained by a trusted entity comprising a shared registry that is separate from the system.

3. The system of claim 2, wherein the GUID is received via a secure transmission channel from the shared registry.

4. The system of claim 3, wherein the digital signature is utilized to verify authenticity of the ML model generating the content at the content consumer platform, and wherein the content consumer platform verifies the GUID using a secure transmission channel to the shared registry.

5. The system of claim 1, wherein the digital signature is further based on a model identifier (ID) of the ML model.

6. The system of claim 1, wherein the digital signature is further based on a timestamp corresponding to generation of the content.

7. The system of claim 1, wherein the digital signature comprises a hash-based message authentication code (HMAC) of the content and the GUID.

8. The system of claim 1, wherein the one or more processors include a central processing unit (CPU).

9. The system of claim 1, wherein the hardware accelerator includes a graphics processing unit (GPU).

10. A non-transitory computer-readable storage medium having stored thereon executable computer program instructions that, when executed by one or more processors, cause the one or more processors to perform operations comprising:
    identifying a global unique identifier (GUID) for a machine learning (ML) model;
    generating a digital signature for content generated by an inference stage of the ML model, the digital signature based on at least the GUID of the ML model and the content generated by the ML model; and
    transmitting the content and the digital signature to a content consumer platform.

11. The non-transitory computer-readable storage medium of claim 10, wherein the GUID comprises a unique identifier of the ML model that corresponds to a model identifier (ID) of the ML model, and wherein the GUID is maintained by a trusted entity comprising a shared registry.

12. The non-transitory computer-readable storage medium of claim 11, wherein the digital signature is utilized to verify authenticity of the ML model generating the content at the content consumer platform, and wherein the content consumer platform verifies the GUID using a secure transmission channel to the shared registry.

13. The non-transitory computer-readable storage medium of claim 10, wherein the digital signature is further based on a model identifier (ID) of the ML model.

14. The non-transitory computer-readable storage medium of claim 10, wherein the digital signature is further based on a timestamp corresponding to generation of the content.

15. The non-transitory computer-readable storage medium of claim 10, wherein the digital signature comprises a hash-based message authentication code (HMAC) of the content and the GUID.

16. A method comprising:
    receiving, by a processor of a content consumer platform, content generated by a machine learning (ML) model and a digital signature corresponding to the content;
    processing the digital signature to extract, from the digital signature, a global unique identifier (GUID) of the ML model that generated the content;
    verifying the extracted GUID against data obtained from a shared registry, the data obtained from the shared registry comprising identifying information of the ML model including the GUID; and in response to successfully verifying the extracted GUID, providing the content for consumption at the content consumer platform and indicating that the content is generated by the ML model having verified authenticity.

17. The method of claim 16, wherein the GUID comprises a unique identifier of the ML model that corresponds to a model identifier (ID) of the ML model.

18. The method of claim 16, wherein the shared registry comprises a trusted entity that is separate from the content consumer platform.

19. The method of claim 16, wherein the digital signature comprises a hash-based message authentication code (HMAC) of the content and the GUID.

20. The method of claim 16, wherein the digital signature comprises a hash-based message authentication code (HMAC) of the content, the GUID, a model identifier (ID) of the ML model, and a timestamp corresponding to generation of the content.

* * * * *